(12) United States Patent
Thiele et al.

(10) Patent No.: US 8,403,260 B2
(45) Date of Patent: Mar. 26, 2013

(54) AIRSHIP HANDLING DEVICES AND ASSOCIATED SYSTEMS AND METHODS

(75) Inventors: James R. Thiele, Hillsboro, OR (US); Carl F. Daley, Hillsboro, OR (US)

(73) Assignee: American Blimp Co., LLC, Hillsboro, OR (US)

( * ) Notice: Subject to any disclaimer, the term of this patent is extended or adjusted under 35 U.S.C. 154(b) by 0 days.

(21) Appl. No.: 13/619,862

(22) Filed: Sep. 14, 2012

(65) Prior Publication Data

US 2013/0009006 A1 Jan. 10, 2013

Related U.S. Application Data

(63) Continuation of application No. 12/432,631, filed on Apr. 29, 2009, now abandoned.

(60) Provisional application No. 61/049,355, filed on Apr. 30, 2008.

(51) Int. Cl.
*B64F 1/12* (2006.01)
(52) U.S. Cl. ........................ 244/116; 244/114 R; 244/30
(58) Field of Classification Search .............. 244/114 R, 244/115, 116, 110 F, 110 G, 30, 33
See application file for complete search history.

(56) References Cited

U.S. PATENT DOCUMENTS

| | | | |
|---|---|---|---|
| 1,706,414 A | 3/1929 | Schnitzer | |
| 2,704,193 A | 3/1955 | Alard | |
| 3,987,746 A | 10/1976 | McCulloh | |
| 4,089,492 A | 5/1978 | Lang | |
| 4,568,098 A | 2/1986 | Landry, Jr. | |
| 5,042,415 A | 8/1991 | Hoffman | |
| 5,097,609 A | 3/1992 | Swaggert | |
| 5,176,341 A | 1/1993 | Ishikawa et al. | |
| 5,497,962 A | 3/1996 | Wood | |
| 7,040,680 B2 | 5/2006 | Grinsted | |
| 7,055,778 B2 | 6/2006 | Eberle et al. | |
| 7,334,757 B2 | 2/2008 | Steinkerchner et al. | |
| 2009/0272845 A1 | 11/2009 | Thiele et al. | |

FOREIGN PATENT DOCUMENTS

| | | |
|---|---|---|
| GB | 234169 | 5/1925 |
| JP | 1-285495 | 11/1989 |

OTHER PUBLICATIONS

International Search Report and Written Opinion; International Patent Application No. PCT/US09/042170; Filed Apr. 29, 2009; American Blimp Corporation; Mailed on Jun. 17, 2009.

*Primary Examiner* — Timothy D Collins
*Assistant Examiner* — Jamie S Stehle
(74) *Attorney, Agent, or Firm* — Perkins Coie LLP

(57) ABSTRACT

Airship handling devices and associated systems and methods are disclosed herein. An airship handling device in accordance with one embodiment of the disclosure, for example, can include a first support member mountable to a ground vehicle. The device can also include a second support member operably coupled to the first support member and configured to rotatably move relative to the first support member about a support member axis. The second support member is out of contact with the ground vehicle. The device can further include a line attachment portion carried by the second support member and positioned to releasably couple a flexible handling line from an airship to the second support member. The handling line is not coupled to a winch.

12 Claims, 13 Drawing Sheets

AIRSHIP HANDLING DEVICES AND ASSOCIATED SYSTEMS AND METHODS

CROSS-REFERENCE TO RELATED APPLICATIONS

This application is a continuation of U.S. patent application Ser. No. 12/432,631 filed Apr. 29, 2009, which application claims the benefit of U.S. Provisional Patent Application No. 61/049,355, filed Apr. 30, 2008, both of which are incorporated herein by reference in their entirety.

TECHNICAL FIELD

The present disclosure relates generally to airship handling devices and associated systems and methods.

BACKGROUND

Airborne vehicles, such as blimps or other airships, provide enhanced capabilities and economical access to areas of operation where conventional fixed-wing aircraft are unreasonable or unacceptably costly. For example, blimps can perform a wide variety of different types of missions, including surveillance for military or law enforcement operations, monitoring weather conditions, and a variety of different missions relating to advertising and/or tourism.

Many blimps or airships, however, require a significant amount of manpower during the ground handling phase of operations. For example, most blimps require at least 16 people during ground handling operations. The required manpower can be significantly higher for ground handling of larger blimps and/or maneuvers involving hangers or other structures. While these arrangements have proven reasonably effective for current operations, it is increasingly difficult and expensive to have such a significant manpower requirement.

DETAILED DESCRIPTION

The present disclosure describes airship handling devices and associated systems and methods. Many specific details of certain embodiments of the disclosure are set forth in the following description and in FIGS. 1-8C to provide a thorough understanding of these embodiments. Well-known structures, systems, and methods often associated with such systems have not been shown or described in detail to avoid unnecessarily obscuring the description of the various embodiments of the disclosure. In addition, those of ordinary skill in the relevant art will understand that additional embodiments of the disclosure may be practiced without several of the details described below.

A. Embodiments of Airship Handling Devices and Associated Systems and Methods

Figure 1:
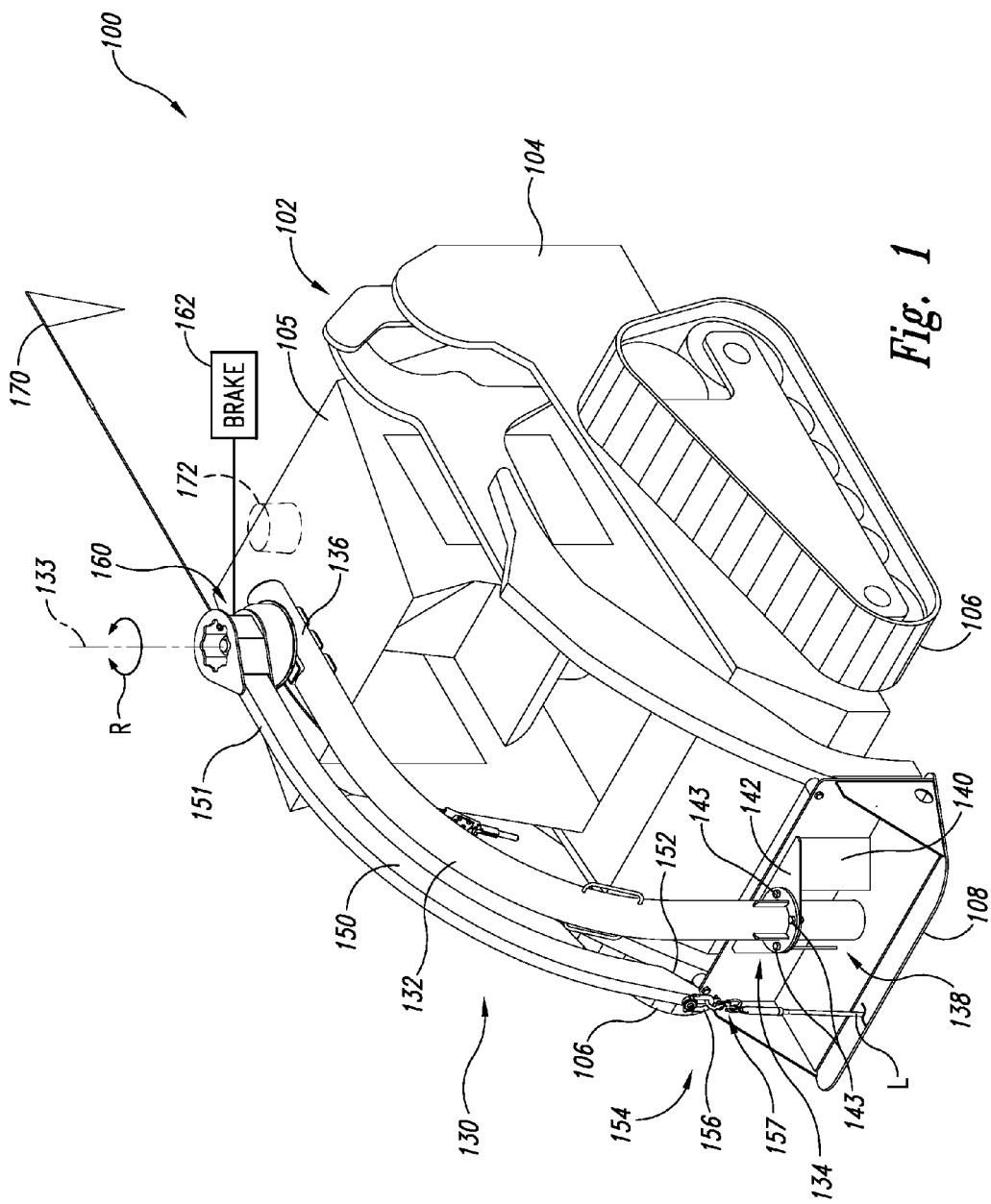
FIG. 1 is a partially schematic, isometric view of an airship handling device which includes a ground vehicle and an airship handling assembly configured in accordance with an embodiment of the disclosure.

FIG. 1 is a partially schematic, isometric view of an airship handing device 100 configured in accordance with an embodiment of the disclosure. The device 100 includes a ground vehicle 102 and an airship handling assembly 130 carried by the ground vehicle 102. The device 100 is configured to handle one or more flexible recovery or handling lines L from an airship or blimp (not shown) during ground operations (e.g., landing, takeoff, etc.) of the airship. As described in greater detail below, the device 100 is expected to (a) require significantly less manpower than conventional ground handing operations described above, and/or (b) improve and/or simplify ground handling operations when compared with conventional manpower-intensive ground operations.

The ground vehicle 102 can include a small, highly maneuverable vehicle capable of supporting the airship handling assembly 130 and the corresponding forces from the line L attached to the airship (not shown). The ground vehicle 102, for example, can include a body 104, a set of tracks 106 for steering the vehicle 102 over a wide variety of different terrains, and a bucket 108. An operator or driver (not shown) can sit within a cab 105 of the vehicle 102. In one embodiment, the ground vehicle can include a compact track or skid steer vehicle, such as a Bobcat® T190 compact track loader, commercially available from the Bobcat Company of West Fargo, N. Dak. In other embodiments, however, the ground vehicle 102 can include a variety of different types of vehicles (e.g., loaders, pickup trucks, tanks, etc.). Furthermore, the size and configuration of the ground vehicle 102 can vary depending, at least in part, on the size of the airship and/or the operational conditions under which the ground vehicle 102 is used.

The airship handling assembly 130 can include a first support member 132 (e.g., a support boom or arm) and a second support member 150 (e.g., a pivot boom or control arm) rotatably attached to the first support member 132. The support boom 132 can be engaged with the ground vehicle 102, and the pivot boom 150 can be carried by the support boom 132 and positioned to rotate (as shown by the arrow R) about a boom axis 133. In this way, the pivot boom 150 can become self-oriented or self-aligned with the airship (not shown) when the line L is coupled between the airship and the pivot boom 150.

The support boom 132 has a first or proximal end 134 fixedly attached to the bucket 108 and a second or distal end 136 spaced apart from the first end 134. The support boom 132 can be composed of steel or another suitable material having a desired rigidity and strength for the selected operational conditions. The first end 134 of the support boom 132 is attached to a boom attachment feature or boom mount 138, which is in turn attached to the bucket 108. In the illustrated embodiment, the boom attachment feature 138 includes a first attachment portion 140 (e.g., a backplate) fixedly attached to the bucket 108 using fasteners (not shown) or other suitable attachment techniques (e.g., welding, etc.). The boom attachment feature 138 further includes a second attachment feature 142 (e.g., a bracket) positioned to engage the first end 134 of the support boom 132. The first end 134 can be attached to the second attachment feature 142 using one or more suitable fasteners 143 or other suitable attachment techniques. In other embodiments, the support boom 132 and/or the boom attachment feature 138 can have a different configuration or different features. In still other embodiments, the first end 134 can be attached directly to the bucket 108 without the boom attachment feature 138.

In one particular aspect of an embodiment illustrated in FIG. 1, the support boom 132 has a curved shape such that the second end 136 of the support boom 132 is approximately centered over and spaced apart from the cab 105 of the ground vehicle 102. This arrangement can position the boom axis 133 so as to be centered over the turning point of the ground vehicle 102, e.g., when the ground vehicle 102 conducts an on-the-spot turn utilizing its skid steering. In addition, the second end 136 of the support boom 132 and the other portions of the airship handling assembly 130 are accordingly out of contact with the ground vehicle 102. Further, no additional structural or electrical connections are required between the airship handling assembly 130 and the ground vehicle 102. One advantage of this arrangement is that the airship handling assembly 130 can quickly and easily be installed on and removed from existing ground vehicles 102 with little or no retrofitting. The boom handling assembly 130 shown in FIG. 1, for example, can be easily installed on the ground vehicle 102 using common hand tools. In other embodiments, however, the airship handling assembly 130 may have one or more additional portions in contact with and/or engaged with the ground vehicle 102.

In a particular embodiment, the ground vehicle 102 has lifting arms that can support a bucket or any of a wide variety of other attachments. The bucket (or other attachments) are easily removed via a hand-operated release mechanism and/or via hand tools. Accordingly, the bucket 108, with the attachment features 138, 142 can replace a conventional bucket that is typically supplied with the ground vehicle 102. The shape of the bucket 108 allows it to support the support boom 132 and also carry other accessories (e.g., tools) while performing ground handling duties. In other embodiments, other attachment structures that connect to the ground vehicle 102 (e.g., a reinforced plate) can be used instead of the bucket 108.

The pivot boom 150 has a first or proximal end 151 operably coupled to a boom rotation assembly or spindle assembly 160, and a second or distal end 152 spaced apart from the first end 151. The pivot boom 150 can be composed of a material generally similar to the material of the support boom 132. For example, the pivot boom 150 may be composed of steel having the desired strength and operational characteristics. In other embodiments, however, the pivot boom 150 may be composed of a different material. The boom rotation assembly 160 is configured to allow the pivot boom 150 to freely rotate (360 degrees) about the boom axis 133 during operation. As mentioned above, the pivot boom 150 can accordingly become self-oriented or self-aligned with the airship (not shown) throughout ground operations when the line L is coupled between the airship and the pivot boom 150.

In several embodiments, the boom rotation assembly 160 can also include a brake 162 (shown schematically) to lock the pivot boom 150 at one or more desired positions relative to the ground vehicle 102 and/or the support boom 132. For example, the brake 162 may be configured to lock the pivot boom 150 at a desired position (e.g., approximately aligned with the support boom 132) when the airship handling assembly 130 is in an "unloaded" condition (i.e., not connected to a handling line of an airship). Locking the pivot boom 150 in such a position can allow the ground vehicle 102 to be moved to a desired location over a variety of different terrains (e.g., rough or uneven ground, etc.) without the pivot boom 150 moving in an uncontrolled manner. The brake 162 can also be used during the initial phase of ground operations to lock the pivot boom 150 in a desired position (e.g., abeam or approximately 90 degrees away from a current heading of the ground vehicle 102) while the handling line L from the airship is connected to the pivot boom 150. Once the line L is connected, the brake 162 can be disengaged or released so that the pivot boom 150 can rotate freely about the boom axis 133. The brake 162 can include an electrical, mechanical, and/or other brake mechanism which can be operated by the vehicle operator. In other embodiments, the brake 162 may have a different configuration and/or different features. Further, the brake 162 may not be included in some embodiments.

The second end 152 of the pivot boom 150 can include a line attachment portion 154 to which the line L from the airship (not shown) can be connected. In the embodiment illustrated in FIG. 1, the line attachment portion 154 can include a shackle or hook 156 coupled to the pivot boom 150 and configured for quick attachment and/or release to a corresponding shackle or hook 157 on the line L. A suitable shackle 156 can include a quick release snap shackle, commercially available from Ronstan International, Inc. of Portsmouth, R.I. In other embodiments, however, the line attachment portion 154 may have a different type of shackle 156. For example, as described in greater detail below with reference to FIGS. 7A-7C, the shackle 156 may be replaced by a line capture and release device having two line guide devices (e.g., hitch balls) configured to releasably engage the line L. In still another embodiment, the shackle 156 can include a remotely controllable device that can be activated (e.g., opened to release the line L) remotely by a member of the ground crew or the operator of the ground vehicle 102. In still other embodiments, the line L may be releasably secured to the pivot boom 150 using another suitable method in addition to, or in lieu of, the shackle 156.

In another particular aspect of the embodiment illustrated in FIG. 1, the pivot boom 150 has a curved shape such that the second end 152 of the pivot boom 150 is at a desired elevation relative to the ground adjacent to the ground vehicle 102. One feature of this arrangement is that the line attachment portion 154 is at a height above the ground adjacent to the ground vehicle 102 that is comfortable for a ground crew member (not shown) to access when attaching the line L to the line attachment portion 154.

Another feature of this arrangement is that the line attachment feature 154 is also at a desired elevation relative to the center of gravity of the ground vehicle 102. More specifically, the line attachment feature 154 can be approximately aligned along a force axis extending between the center of gravity of the ground vehicle 102 and a distal attachment point of the line L on the airship (not shown). In this way, during operation the ground vehicle 102 can apply tension or pull on the line L without tipping over or becoming unstable, regardless of the orientation of the ground vehicle 102. In some cases, a tension or force that is applied by the line L and that is above a threshold value may cause the ground vehicle 102 to slide, but it is not expected to cause the ground vehicle 102 to tip. Because the airship is located above the ground vehicle 102, the force axis generally passes below, at, or slightly above the vehicle center of gravity, thus reducing or eliminating the likelihood that the vehicle will tip Still another feature of the foregoing arrangement is that the line L is less likely to foul with or otherwise interfere with the operation of the ground vehicle 102. For example, because the pivot boom 150 can rotate so as to continuously orient the line L with the airship, and because the boom axis 133 is approximately centered on the ground vehicle 102, it is very unlikely that the line L can become wrapped around the ground vehicle 102.

The airship handling assembly 130 may also include a flag or location indicator 170 attached to the first end 151 of the pivot boom 150. The flag 170 extends in a direction generally opposite of the pivot boom 150 (e.g., at an angle of approximately) 180° and rotates about the boom axis 133 with the pivot boom 150. The flag 170 is configured to readily identify (e.g., to the operator of the ground vehicle 102, the ground crew, the airship crew, etc.) the orientation of the pivot boom 150 during operation, for example, even if the vehicle and operator are facing away from the pivot boom 150.

In embodiments in which the device 100 may be used for on-airport operations, a suitable light or beacon 172 (shown schematically in broken lines) may be temporarily attached to the cab 105 or other portion of the ground vehicle 102. The light 172 is an optional component that may not be included in some embodiments. Further, the light 172 can be easily removable from the ground vehicle 102.

One feature of an embodiment of the device 100 is that it does not employ a winch or other automated mechanism to wind up and/or control the line L from the airship. Rather, the line L is merely attached to the pivot boom 150 and the boom can freely rotate about the boom axis 133 to maintain alignment with the airship. The line L is not retracted or wound up by the airship handling assembly 130. Instead, the movement of the airship relative to the ground is controlled, at least in part, by movement of the ground vehicle 102 after the line L is coupled to the pivot boom 150. In contrast with conventional airship handling devices that include complex and expensive winches or other mechanisms to reel in and control the handling lines from an airship or blimp, the device 100 is expected to provide a low-cost, low maintenance, and efficient device for ground handling operations. Further details regarding the airship handling device 100 and methods for using the airship handling device 100 during ground handling operations are described below with reference to FIGS. 2A-2F.

Another feature of the device 100 described above is that the device 100 can be quickly deployed and configured for ground handling operations in a variety of different environments and operational conditions. Many conventional airship ground handling systems require elaborate and complex components that require a significant amount time and expense to deploy. In contrast with such conventional systems, the device 100 is a modular device that can be easily transported in a disassembled state to a wide variety of different operational environments, and can be quickly assembled and deployed for ground operations with minimal manpower. For example, in one embodiment the individual components of the device 100 (e.g., the support boom 132, the boom attachment feature 138, the pivot boom 150, the boom rotational assembly 160, the line attachment feature 154, etc.) can be assembled by just two ground crew members using conventional hand tools.

FIGS. 2A-2F are partially schematic illustrations of a system and method for recovering and/or launching an airship or blimp 190 and controlling post-recovery and/or pre-launch ground operations of the airship with two or more airship handling devices 100 configured in accordance with an embodiment of the disclosure. Beginning with FIG. 2A, two airship handling devices 100 (shown schematically) are positioned on either side of and spaced apart from the airship's approach course or vector 192. The airship 190 can include two handling lines L extending downwardly from a nose portion 191 of the airship 190 by gravity or other forces. The pivot booms 150 of the respective devices 100 can be initially positioned abeam of the respective devices 100 and generally aligned with the approach vector 192 of the airship 190. As discussed previously, the pivot booms 150 can be locked in this position before the lines L are attached. A crew chief C can be positioned approximately in front of the airship 190, and one or more ground crew members G can be positioned at least proximate to each device 100 to assist with ground handling operations.

Figure 2A:
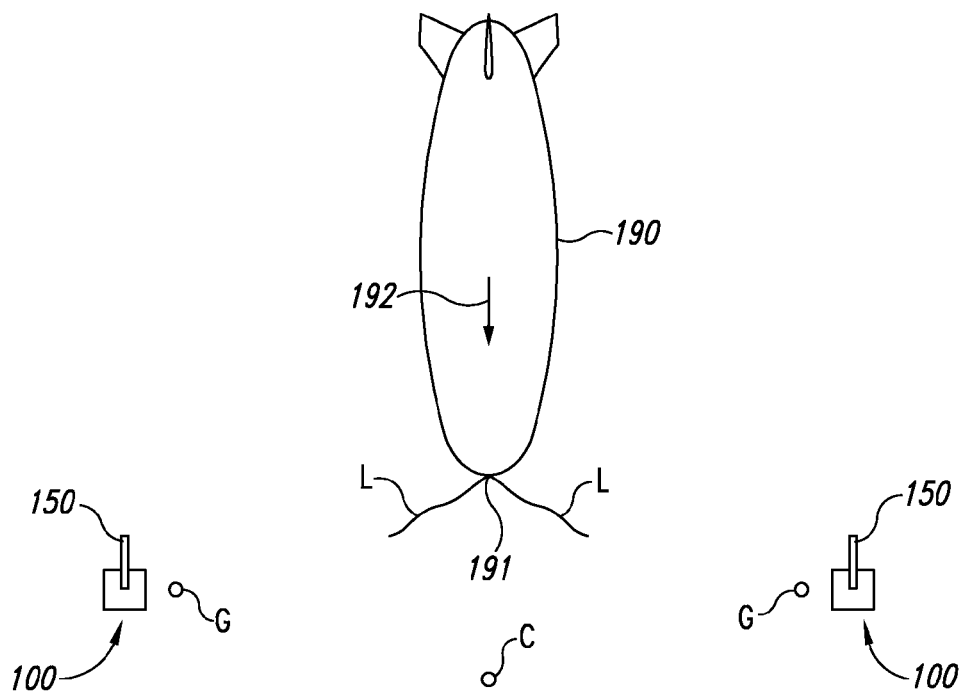
FIGS. 2A-2F are partially schematic illustrations of a system and method for recovering and/or launching an airship or blimp and controlling post-recovery and/or pre-launch operation of the airship with airship handling devices configured in accordance with an embodiment of the disclosure.
Figure 2B:
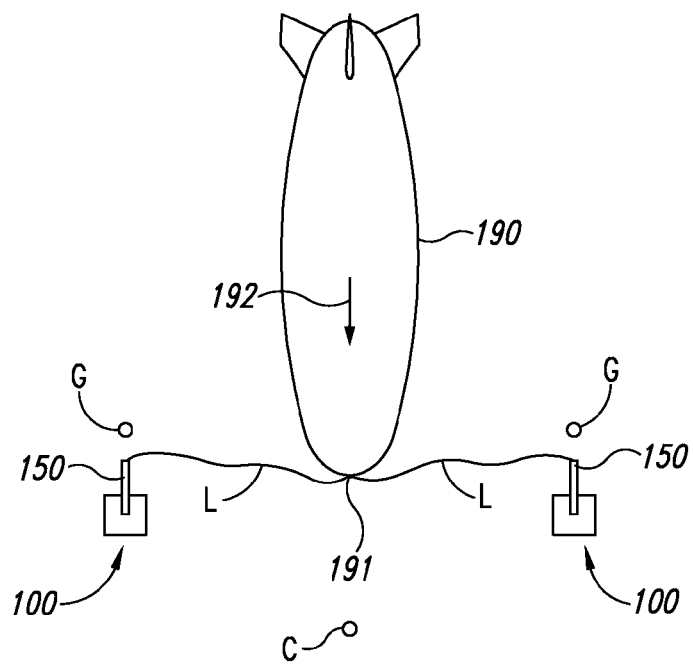

Referring next to FIG. 2B, the devices 100 are moved toward each other and closer to the airship 190 such that devices 100 are just behind the nose portion 191 of the airship 190. The handling lines L are then captured by the respective ground crew member G and attached to the corresponding pivot booms 150 (e.g., at the line attachment portion 154 as shown in FIG. 1). As described above with reference to FIG. 1, the handling lines L can be quickly and easily coupled to the respective pivot booms 150 using quick release shackles or hooks. After attaching the lines L to the pivot booms 150, the pivot booms 150 can be unlocked from their initial, abeam position relative to the airship's approach vector 192 and allowed to freely rotate and self-align or self-orient with the airship 190.

Figure 2C:
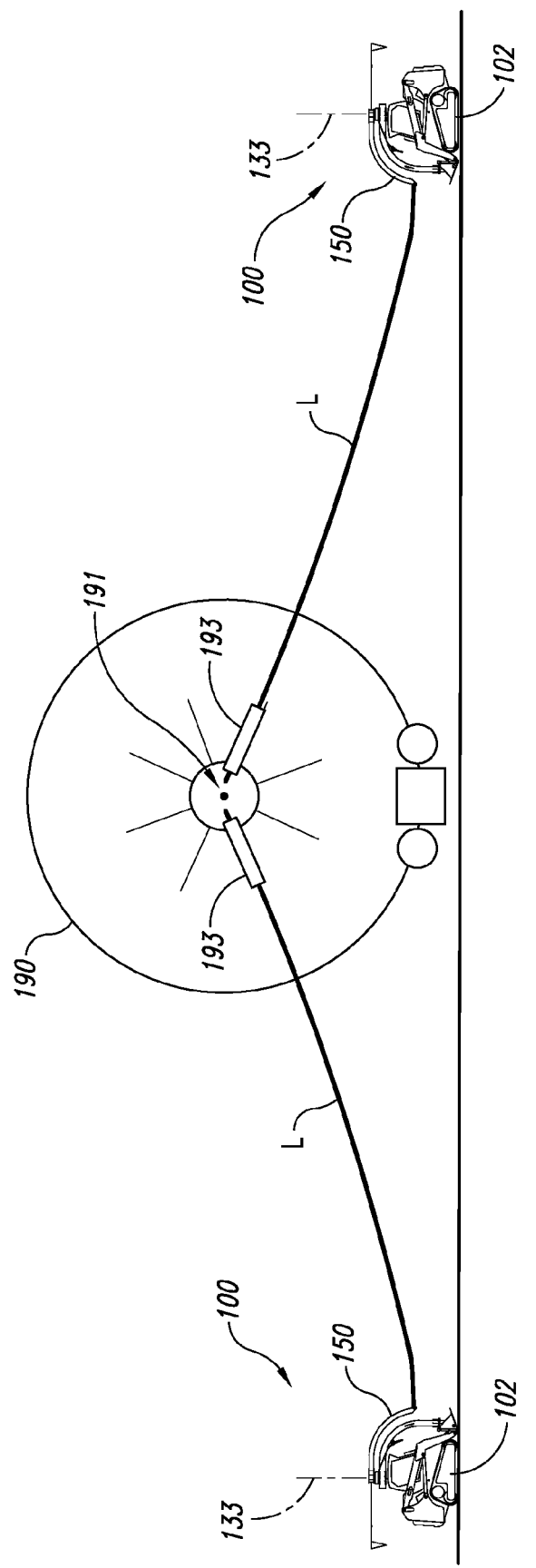

Referring next to FIG. 2C, the devices 100 are driven away (e.g., in reverse) from the airship 190 to take the slack out of the handling lines L and provide a selected tension in the handling lines L. As the devices 100 are moved outwardly away from the airship 190, the pivot booms 150 on the respective devices 100 can freely rotate about the respective boom axes 133 to maintain alignment with the nose portion 191 of the airship 190. The respective devices 100 can also be moved in any desired direction to "guide" the airship 190 toward a mooring mast or hanger.

One feature of the devices 100 is that the ground vehicles 102 can move in any direction, generally without changing the orientation of the lines L. For example, because the pivot booms 150 can freely rotate through 360 degrees relative to the ground vehicles 102, the ground vehicles 102 can stop, rotate in place to a new direction, drive in the new direction, stop again, etc. independent of the orientation of the respective line L. This feature is expected to expedite ground handling operations and allow ground operations in a wide variety of different operational conditions and terrain.

In some embodiments, snubbers 193 (shown schematically) can be attached to the handling lines L. The snubbers 193 are configured to prevent line breakage due to sudden jolting and/or excess stresses in the lines L. The snubbers 193 can be composed of rubber or another suitable material around which the lines L are wound. The snubbers 193 are optional components that may not be included in some embodiments.

Figure 2D:
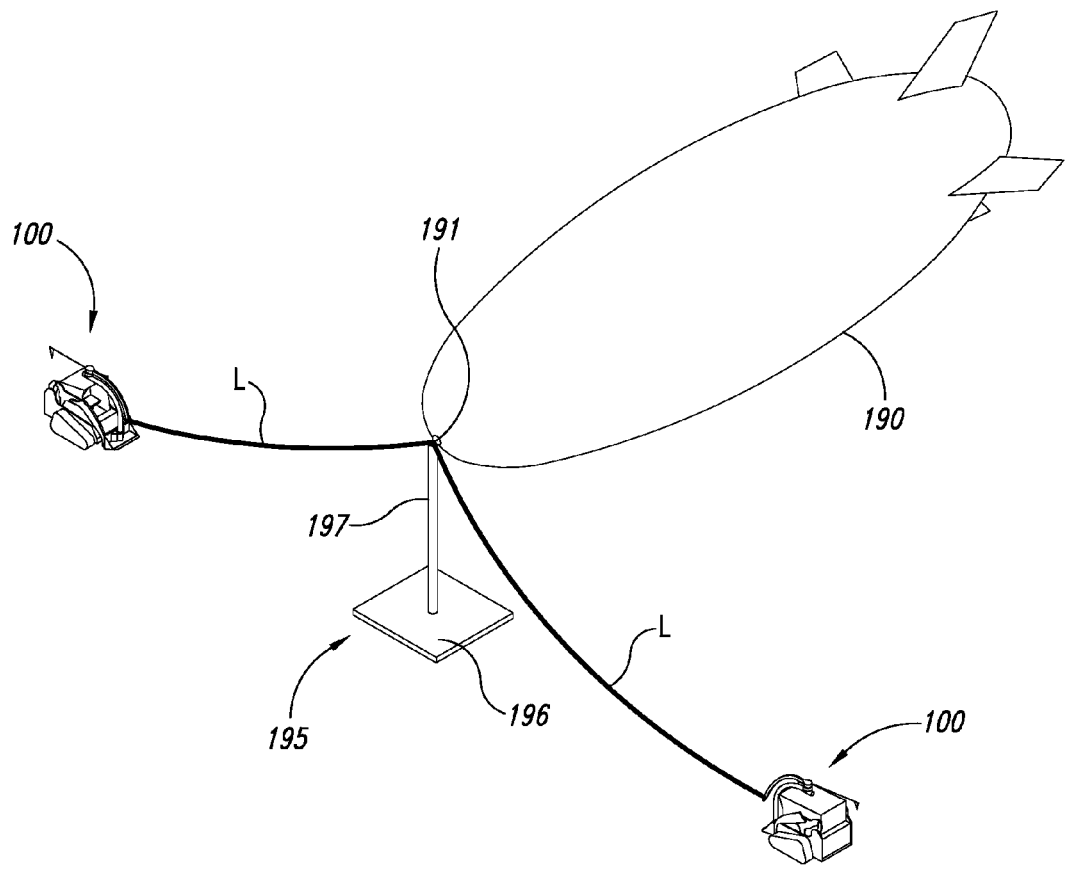

Referring to FIG. 2D, the devices 100 have guided the airship 190 to a mobile ground mooring structure 195 (shown schematically). The mooring structure 195 can include a support platform 196 and a support structure or boom 197 carried by the support platform 196. The mooring structure 195 can include, for example, a trailer configured to be towed by a truck or other suitable land vehicle. In other embodiments, the mooring structure 195 can include other structures, such as a boat or other water vessel, a truck or other land vehicle, or a building. When in position, the nose portion 191 of the airship 190 can be releasably coupled to the support structure 197, and the handling lines L can be uncoupled from the respective devices 100.

Figure 2E:
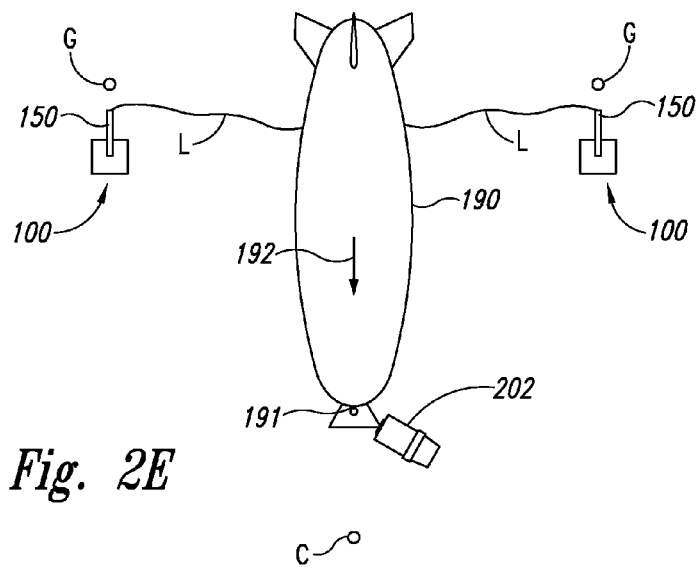
Figure 2F:
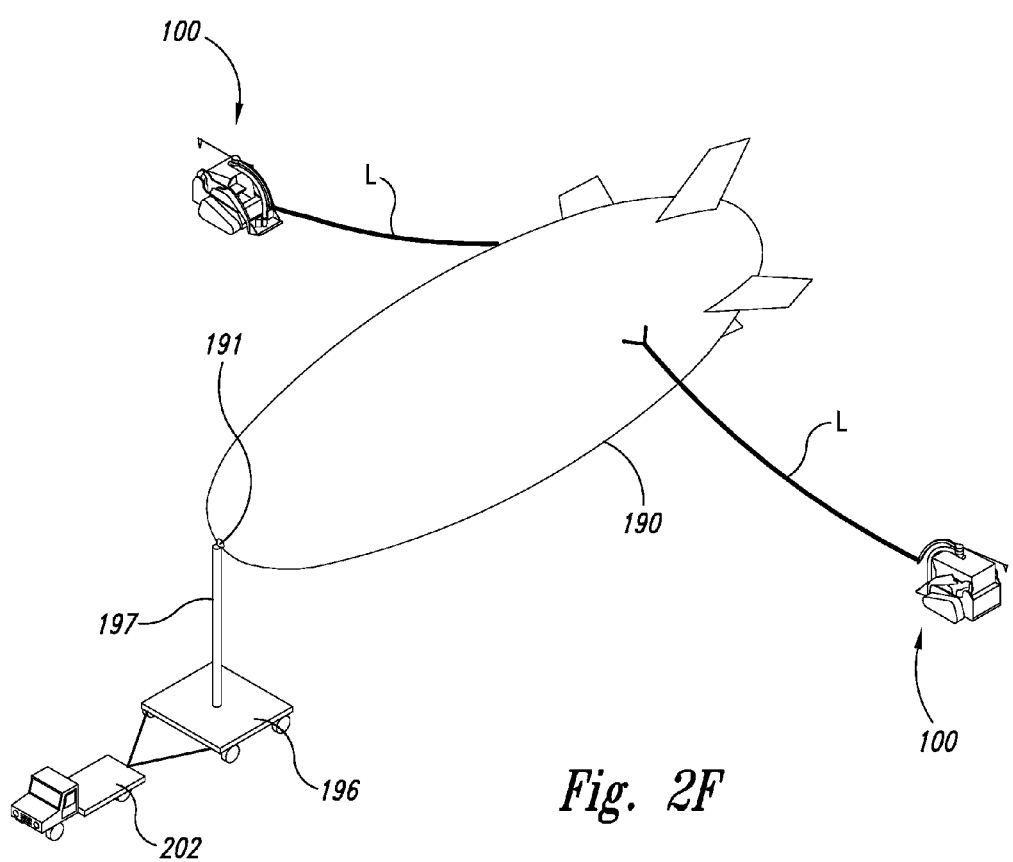

In some instances, one or more devices 100 can be positioned proximate to a tail portion of the airship 190 to help guide the tail portion into and/or out of a hanger or other ground structure and help keep the airship 190 clear of obstructions. For example, as shown in FIGS. 2E-2F, the airship 191 can be maneuvered by two handling devices 100, and a tow vehicle 202 that drives a wheeled or otherwise movable support platform 196 and support structure 197. The devices 100 can also be used to facilitate takeoff operations of the airship 190. For example, during takeoff operations, the handling lines L can be quickly released by the respective ground crew members G (FIG. 2B) when the devices 100 have moved the airship 190 into a desired takeoff position. The ground handling procedures described above with reference to FIGS. 2A-2F are provided as non-limiting examples of various ways in which the devices 100 can be used to facilitate ground handling of the airship 190. It will be appreciated that the devices 100 can be used in a variety of procedures and/or modes of operation different than those described above.

One advantage of using the devices 100 during ground handling operations of the airship 190 is that the devices 100 are expected to significantly reduce the manpower required for such operations. For example, as discussed previously, many conventional airships require sixteen or more people for ground handling operations. In contrast, ground handling operations described above with reference to FIGS. 2A-2F using the devices 100 are expected to require a ground crew of less than ten people (e.g., eight people). During hangar exits and entries this number can be as few as five ground crew. This is expected to significantly reduce the operational costs associated with airship 190, as well as improving and simplifying ground operations.

B. Additional Embodiments of Airship Handling Devices and Associated Systems and Methods FIGS. 3-8C are partially schematic, side elevation views of airship handling devices configured in accordance with additional embodiments of the disclosure. The devices can include a number of features generally similar to the device 100 described above with reference to FIG. 1, and can be used during ground handling operations using methods generally similar to those described above with reference to FIGS. 2A-2F. Moreover, the devices described below with reference to FIGS. 3-8C can have many of the same advantages as the device 100 described above with reference to FIG. 1.

Figure 3:
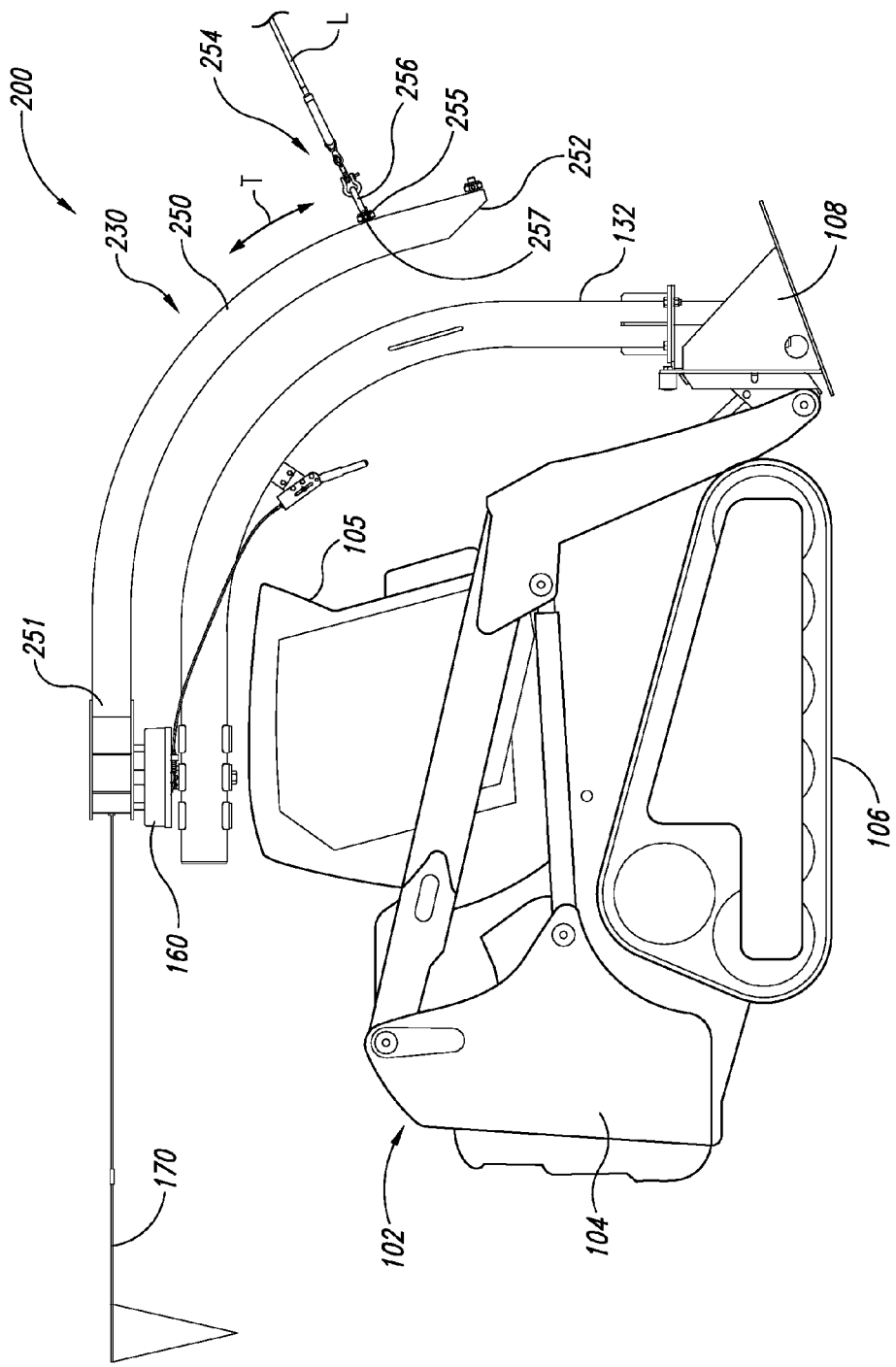
FIG. 3 is a partially schematic, side elevation view of an airship handling device which includes a ground vehicle and an airship handling assembly configured in accordance with another embodiment of the disclosure.

FIG. 3, for example, is a partially schematic, side elevation view of an airship handling device 200 including the ground vehicle 102 and an airship handling assembly 230 configured in accordance with another embodiment of the disclosure. The airship handling assembly 230 differs from the airship handling assembly 130 described above in that the assembly 230 has a pivot boom 250 with a different configuration than the pivot boom 150. More specifically, the pivot boom 250 has a line attachment portion 254 that can translate (as shown by the arrow T) along an arcuate longitudinal axis of the pivot boom 250 rather than being fixed proximate to a distal portion 252 of the pivot boom 250.

The line attachment portion 254, for example, can include a base portion 255 (e.g., a trolley or carriage) that is movable along a groove or channel (not shown) of the pivot boom 250. The base portion 255 can be configured to move, for example, from a first or proximal end 251 of the pivot boom 250 to the second or distal end 252. In other embodiments, however, the line attachment portion 254 may have a different range of movement along the pivot boom 250. The line attachment portion 254 can also include a shackle or hook 256 carried by the base portion 255 and to which the line L may be attached. The shackle 256 can be generally similar to the shackle 156 described above with reference to FIG. 1.

In operation, as the airship (not shown) rises or falls relative to the ground, the line attachment portion 254 can move up or down along the pivot boom 250 to maintain approximate alignment between the line L from the airship and a center of gravity of the device 100. In one embodiment, the line attachment portion 254 may also include a lock or engagement feature 257 configured to releasably secure the line attachment portion 254 at a desired location along the pivot boom 250, rather than allowing the line attachment portion 254 to freely move along the boom 250.

Figure 4:
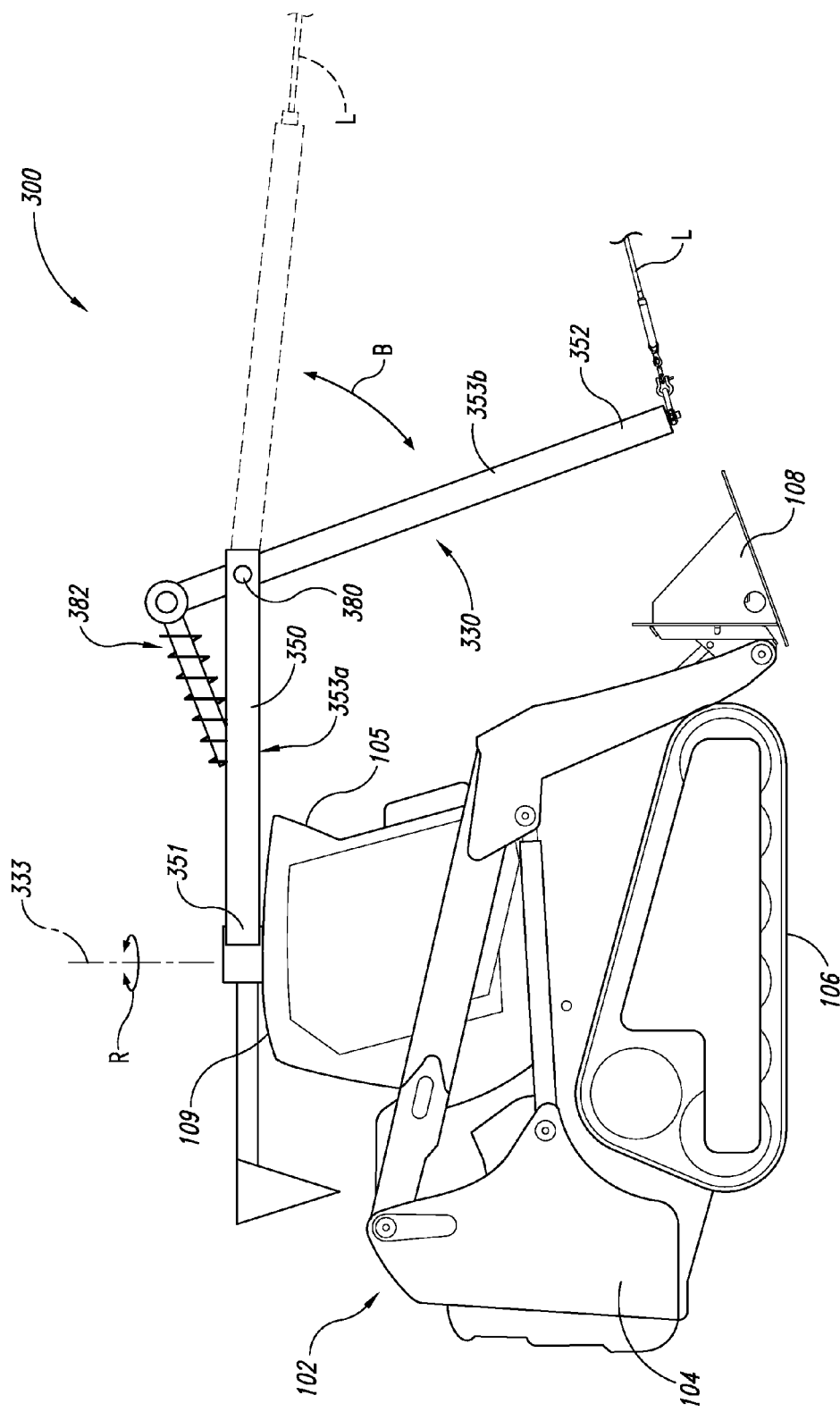
FIG. 4 is a partially schematic, side elevation view of an airship handling device which includes a ground vehicle and an airship handling assembly configured in accordance with still another embodiment of the disclosure.

FIG. 4 is a partially schematic, side elevation view of an airship handling device 300 including the ground vehicle 102 and an airship handling assembly 330 configured in accordance with still another embodiment of the disclosure. The airship handling assembly 330 differs from the airship handling assembly 130 of FIG. 1 in that the assembly 330 does not include two separate support members or booms. Further, the assembly 330 is mounted to a top portion of the ground vehicle 102 rather than the bucket 108.

More specifically, the airship handling assembly 330 can include a pivot boom 350 having a first or proximal end 351 and a second or distal end 352 spaced apart from the first end 351. The pivot boom 350 also includes a line attachment portion 354 at the distal end 352 of the boom and to which the line L may be attached. The first end 351 of the pivot boom 350 is mounted to a boom rotation assembly or spindle 360. The pivot boom 350 is accordingly configured to rotate (360 degrees) about a boom axis 333. The boom rotation assembly 360 is mounted to a top portion 109 of the cab 105 of the ground vehicle 102.

In one particular aspect of the embodiment illustrated in FIG. 4, the pivot boom 350 further includes a first portion 353a that pivots about the boom axis 333, and a second portion 353b that pivots relative to the first portion 353a. The first and second portions 353a and 353b are connected by a hinge assembly 380. The second portion 353b is accordingly a hinged arm that can move (e.g., pivot, as shown by the arrow B) relative to the first portion 353a. A spring shock absorbing member 382 is coupled to both the first and second portions 353a and 353b and is configured to absorb at least some of the forces or loads exerted on the pivot boom 350 by the line L. In operation, the second portion 353b is configured to move (as shown by the arrow B) as the tension on the line L from the airship (not shown) varies. One feature of this arrangement is that the movement of the second portion 353b can add a significant amount of compliance (e.g., approximately three to four feet) to the line L and can accordingly help offset forces or stresses in the line L during ground handing operations and prevent line breakage. In other embodiments, the airship handling assembly 330 may have a different configuration and/or include different features.

Figure 5:
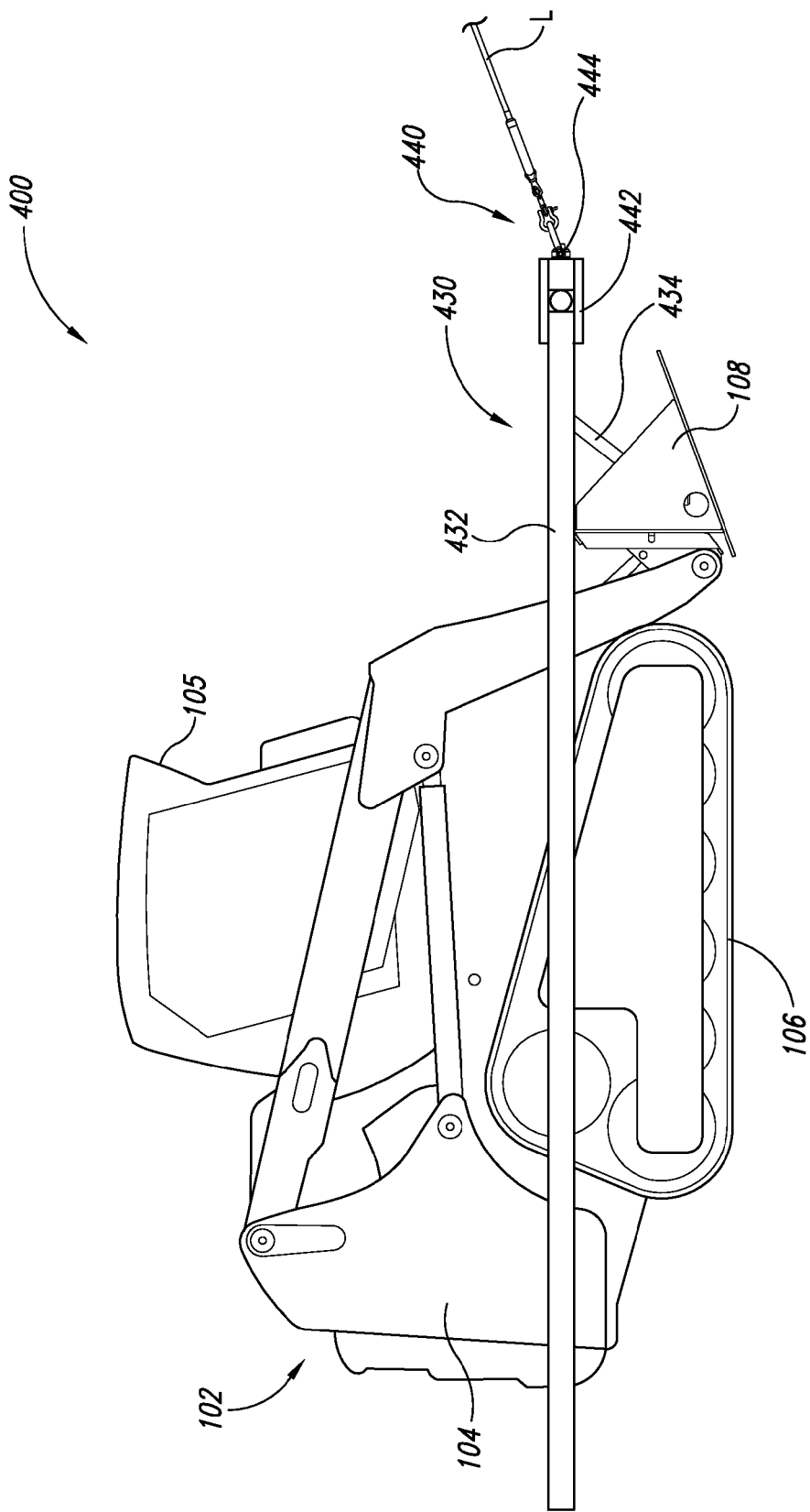
FIG. 5 is a partially schematic, side elevation view of an airship handling device which includes a ground vehicle and an airship handling assembly configured in accordance with yet another embodiment of the disclosure.

FIG. 5 is a partially schematic, side elevation view of an airship handling device 400 including the ground vehicle 102 and an airship handling assembly 430 configured in accordance with yet another embodiment of the disclosure. The airship handling assembly 430 differs from the airship handling assembly 130 of FIG. 1 in that the assembly 430 does not include two separate support members or booms. Rather, the assembly 430 includes a generally circular support member or structure 432 (e.g., a track) attached to and completely encircling the ground vehicle 102. The support member 432, for example, can include a generally round or square tube operably coupled to an attachment feature 434 in the bucket 108 and one or more additional portions of the ground vehicle 102. In other embodiments, however, the support member 432 may have a different configuration and/or be attached to the ground vehicle 102 using other suitable arrangements.

The airship handling assembly 430 also includes a line attachment feature 440 movably carried by the support member 432. The line attachment feature 440 can include a base portion or sled 442 engaged with the support member 432 and configured to freely move along the support member 432. The line attachment feature 440 can also include a shackle or hook 444 to which the line L may be attached. In operation, the line attachment feature 440 can freely move completely around the ground vehicle 102 along the support member 432 to self-align or self-orient the line attachment feature 440 relative to the airship (not shown).

Figure 6:
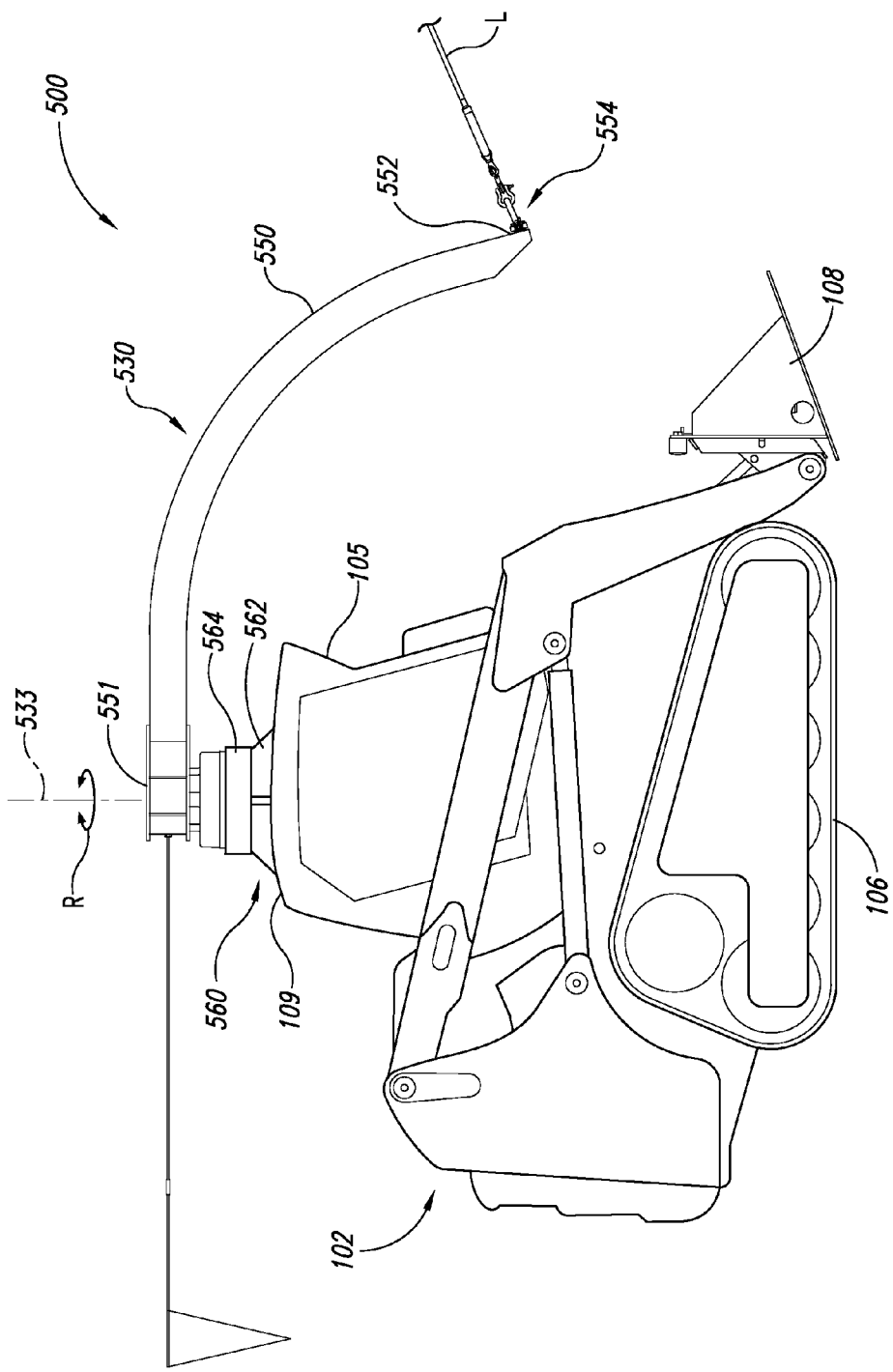
FIG. 6 is a partially schematic, side elevation view of an airship handling device which includes a ground vehicle and an airship handling assembly configured in accordance with still yet another embodiment of the disclosure.

FIG. 6 is a partially schematic, side elevation view of an airship handling device 500 including the ground vehicle 102 and an airship handling assembly 530 configured in accordance with still yet another embodiment of the disclosure. The airship handling assembly 530 differs from the airship handling assemblies described above in that the assembly 530 does not include two separate support members or booms. Further, the assembly 530 is mounted to a top portion of the ground vehicle 102 rather than the bucket 108 or other portions of the ground vehicle 102.

The airship handling assembly 530 can include a pivot boom 550 having a first or proximal end 551 and a second or distal end 552 spaced apart from the first end 551. The pivot boom 550 also includes a line attachment portion 554 at the distal end 552 of the boom and to which the line L may be attached. The first end 551 of the pivot boom 550 is mounted to a boom attachment assembly 560 on the top portion 109 of the cab 105. The boom attachment assembly 560 can include a support member 562 and a boom rotation assembly 564 configured to allow the pivot boom 550 to freely rotate about a boom axis 533 to align the pivot boom 550 relative to the airship (not shown).

Figure 7A:
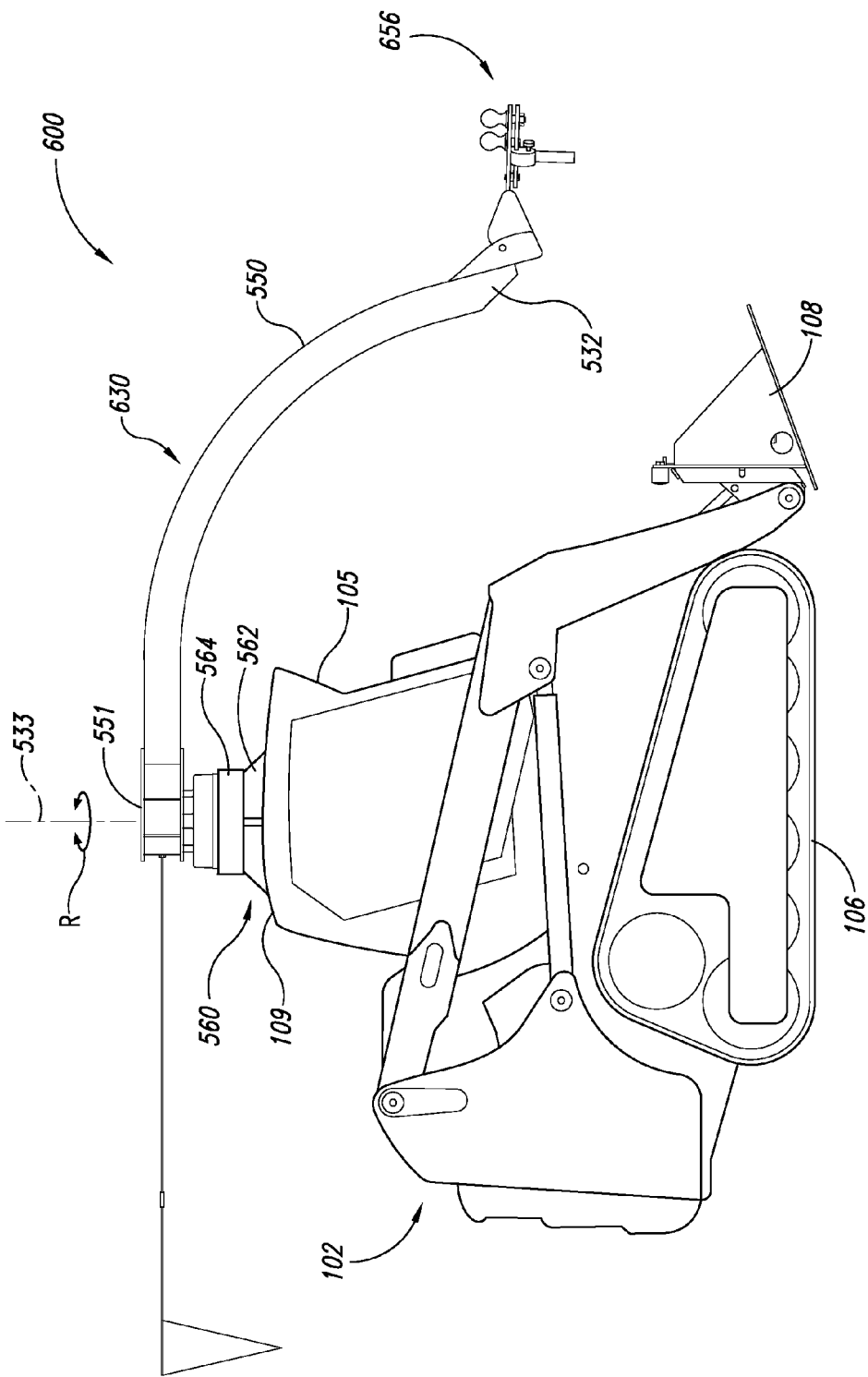
FIG. 7A is a partially schematic, side elevation view of an airship handling device which includes a ground vehicle and an airship handling assembly configured in accordance with another embodiment of the disclosure.

FIG. 7A is a partially schematic, side elevation view of an airship handling device 600 including the ground vehicle 102 and an airship handling assembly 630 configured in accordance with another embodiment of the disclosure. The airship handling assembly 630 differs from the airship handling assemblies described above in that the assembly 630 includes a line capture and release device 656 in lieu of the shackle 156 (FIG. 1). The line capture and release device 656 is operably coupled to the distal end 552 of the boom 550 and positioned to releasably engage the line L (not shown). It will be appreciated that the line capture and release device 656 may be used with any of the airship handling assemblies described above with reference to FIGS. 1-6, or other suitable airship handling assemblies.

Figure 7B:
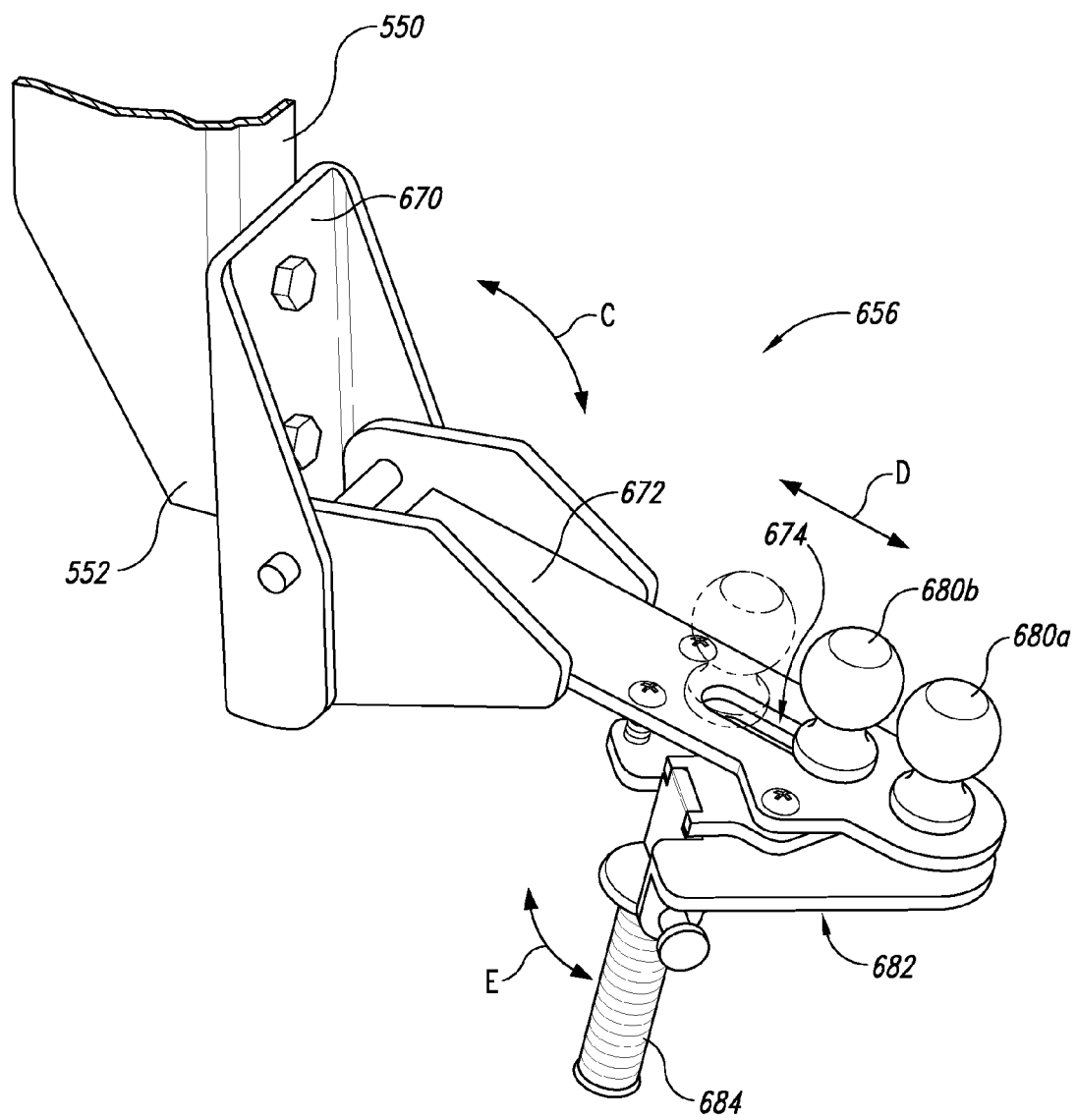
FIGS. 7B and 7C are partially schematic, isometric views of a line capture and release device of the airship handling assembly of FIG. 7A.

FIG. 7B is a partially schematic, isometric view of the line capture and release device 656 of FIG. 7A. The device 656 includes a base portion 670 fixedly attached to the distal end 552 of the boom 550 and an arm portion 672 pivotably attached to the base portion 670. The arm portion 672 is configured to pivot (as shown by the arrow C) relative to the base portion 672 between a stowed position and an operating position (shown in FIG. 7B).

The device 656 also includes two line guide devices or hitch balls 680 (shown as a first hitch ball 680a and a second hitch ball 680b) carried by the arm portion 672. The first hitch ball 680a is fixedly attached to the arm portion 672, and the second hitch ball 680b is movable (as shown by the arrow D) along a guide surface or slot 674 in the arm portion 672 between a first position adjacent to the first hitch ball 680a and a second position (shown in broken lines) spaced apart from the first hitch ball 680a. The device 656 can also include a handle assembly 682 operably coupled to the arm portion 672. The handle assembly 682 includes a handle 684 configured to (a) allow an operator (not shown) to lock/unlock the mechanism from the boom 550, and (b) move the second hitch ball 680b relative to the first hitch ball 680a (as shown by the arrow E). In other embodiments, the line capture and release device 656 can include different features and/or have a different arrangement. For example, although hitch balls are used as line guide devices in the illustrated embodiment, a variety of other suitable devices may be used in addition to, or in lieu of, the hitch balls.

Figure 7C:
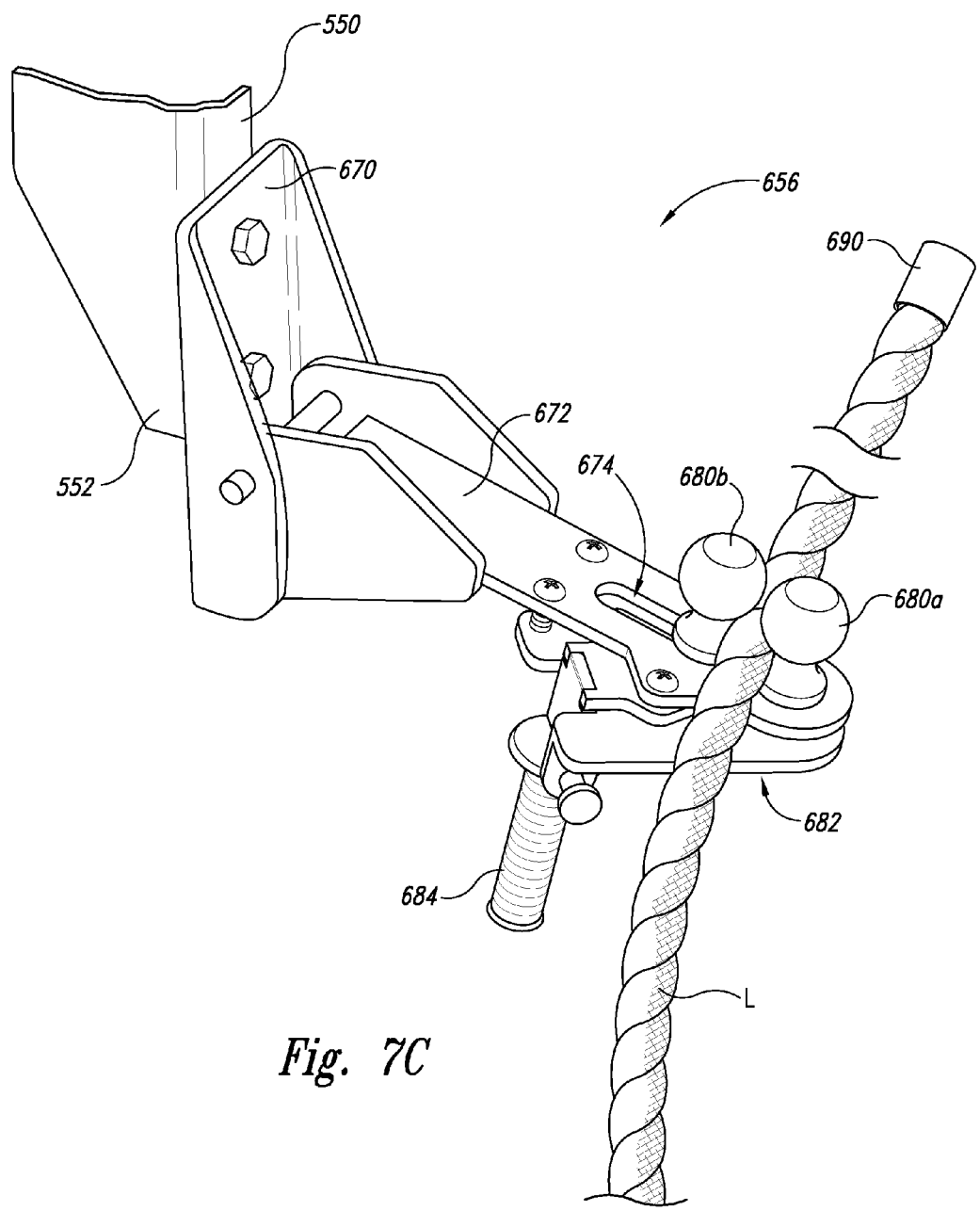

FIG. 7C is a partially schematic, isometric view of the line capture and release device 656 of FIGS. 7A and 7B in operation. The initial stages of this process can be generally similar to those described above with reference to FIGS. 2A and 2B. Rather than coupling the line L to a shackle or hook as described previously, however, a ground crew member (not shown) positions the line L between the first and second hitch balls 680a and 680b. In the illustrated embodiment, the device 656 is positioned at approximately a midpoint of the line L. In other embodiments, however, the device 656 may be engaged with other portions of the line L.

After positioning the line L between the first and second hitch balls 680a and 680b and moving the handle 684 to put the second hitch ball 680b in the first position, the next stage of this process can be generally similar to the method described above with references to FIGS. 2C-2F. For example, as described above with reference to FIG. 2C, the devices 100 (FIG. 2C) can be driven away (e.g., in reverse) from the airship 190 (FIG. 2C) to take the slack out of the lines L. Referring back to FIG. 7C, the line L slides relative to and between the first and second hitch balls 680a and 680b until a stopper 690 (shown schematically) at or proximate to an end of the line L contacts the hitch balls 680a and 680b when the slack is taken out of the line L. The stopper 690 can include, for example, a device attached to or proximate to an end of the line L and positioned to engage the first and second hitch balls 680a and 680b to releasably hold the line L in place against the device 656 and prevent the line L from becoming inadvertently disengaged from the device 656. Further details regarding the stopper are described below with reference to FIGS. 8A-8C.

As stated above, the ground handling procedures described herein are provided as non-limiting examples of various ways to facilitate ground handling of the airship 190 (FIGS. 2A-2F), and it will be appreciated that the devices 100 (FIGS. 2A-2F) described herein can be used in a variety of procedures and/or modes of operation different than those described above.

Figure 8A:
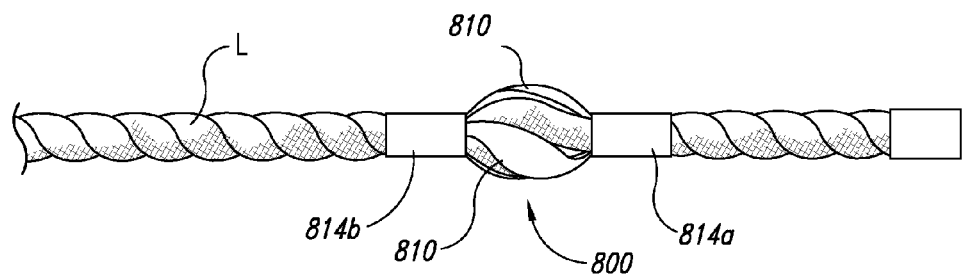
FIGS. 8A-8C illustrate a stopper configured in accordance with an embodiment of the disclosure.
Figure 8B:
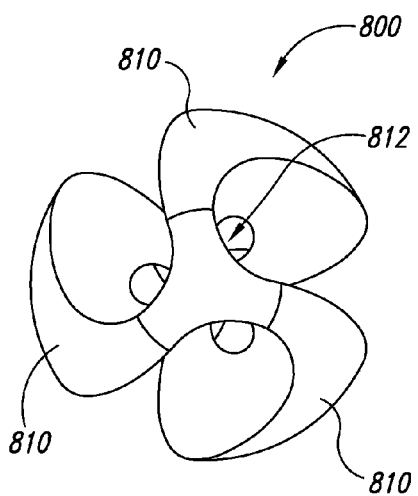
Figure 8C:
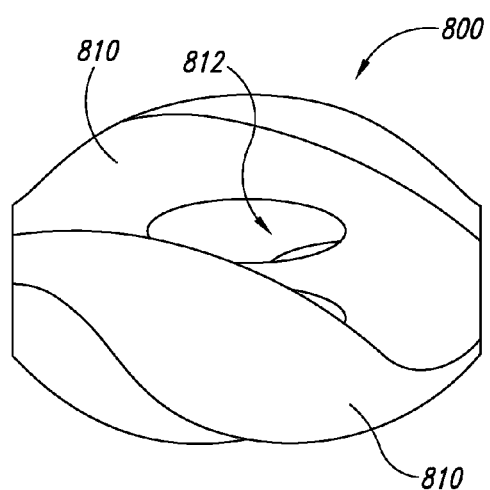

FIGS. 8A-8C illustrate a stopper 800 configured in accordance with one embodiment of the disclosure. The stopper 800 can be used, for example, with the airship handling assembly 600 described above with reference to FIGS. 7A-7C, or with other suitable systems. FIG. 8A is a partially schematic view of the stopper 800 attached to the handling line L, and FIGS. 8B and 8C illustrate the stopper 800 before installation with the handling line L. Referring FIGS. 8A-8C together, the stopper 800 is configured to be attached to or mate with the handling line L at or proximate to an end of the line L. The stopper 800 can include a plurality of engagement portions or fin portions 810 positioned to engage the line L and hold the stopper 800 in place relative to the line L. The stopper 800 can also include a line receiving aperture or opening 812 through which at least a portion of the line L is passed. In other embodiments, the stopper 800 may have a different configuration and/or include different features.

Referring to FIG. 8A, one or more stopper positioning features 814 (two are shown as stopper positioning features 814a and 814b) can be installed with the line L adjacent to the stopper 800. The positioning features 814a and 814b are configured to help hold the stopper 800 in place relative to the line L during operation and prevent inadvertent movement or slipping of the stopper 800 from the line L. In the illustrated embodiment, the positioning features 814a and 814b are heavy duty shrink wrap. In other embodiments, however, a variety of different materials may be used for the positioning features 814a and 814b and/or the positioning features 814a and 814b may have a different arrangement. The positioning features 814a and 814b are an optional component that may not be included in some embodiments.

From the foregoing, it will be appreciated that specific embodiments have been described herein for purposes of illustration, but that the disclosure encompasses additional embodiments as well. For example, the airship handling assemblies described above with reference to FIGS. 1-8C may have different configurations and/or include different features. In a particular example, the line L from the airship may be releasably coupled to the pivot boom 150 using other suitable devices or techniques in lieu of the shackle 156 and the line capture and release device 656. In another example, the airship handling assembly may be attached to a vehicle other than a skid steer loader, e.g., to a "fifth wheel" mounted on a pickup truck.

Specific elements of any of the foregoing embodiments can be combined or substituted for elements in other embodiments. For example, the systems and methods described in the context of specific airship or blimp systems can, in particular embodiments, be implemented in a number of other airship or non-airship systems (e.g., ship docking, crane lines, animal handling, etc.) that include handling lines and manpower-intensive handling operations. Certain aspects of the disclosure are accordingly not limited to airship or blimp systems. Furthermore, while advantages associated with certain embodiments of the disclosure have been described in the context of these embodiments, other embodiments may also exhibit such advantages, and not all embodiments need necessarily exhibit such advantages to fall within the scope of the disclosure. Accordingly, embodiments of the disclosure are not limited except as by the appended claims.

We claim:

1. An airship handling device, comprising:
 a first support member mountable to a ground vehicle, wherein the first support member has a generally curved shape with a first end mountable to a front portion of the ground vehicle, and a second end spaced apart from the first end and approximately over a center of gravity of the ground vehicle;
 a second support member operably coupled to the first support member and configured to rotatably move relative to the first support member about a support member axis, wherein the second support member is out of contact with the ground vehicle wherein the second support member includes a first end rotatably mounted to the second end of the first support member, and a second end spaced apart from the first end and having a lower elevation relative to the ground vehicle than the first end, and wherein the second support member has a generally curved shape corresponding, at least in part, to the curved shape of the first support member; and
 a line attachment portion carried by the second support member and positioned to releasably couple a flexible handling line from an airship to the second support member, wherein the handling line is not coupled to a winch.

2. The airship handling device of claim 1 wherein: the line attachment portion is proximate to the second end of the second support member.

3. The airship handling device of claim 2 wherein the first end of the first support member is the only portion of the airship handling device in contact with the ground vehicle.

4. The airship handling device of claim 1 wherein the second support member is configured to freely rotate through 360 degrees about the support member axis to self-align the second support member with the airship when the flexible handling line is releasably coupled to the second support member.

5. The airship handling device of claim 1 wherein the line attachment portion comprises a shackle positioned to releasably engage the flexible handling line.

6. The airship handling device of claim 1 wherein the line attachment portion comprises:
 a base portion fixedly attached to a distal portion of the second support member;
 an arm portion pivotably coupled to the base portion; and
 a first line guide device and a second line guide device carried by the arm portion, wherein the first and second line guide devices are positioned to contact the flexible handling line, and wherein the second line guide device is movable relative to the first line guide device between (a) a first position adjacent to the first line guide device, and (b) a second position spaced apart from the first line guide device,
 wherein in the first position, the first and second line guide devices are spaced apart by a distance less than a diameter of the flexible handling line, and
 wherein in the second position, the first and second line guide devices are spaced apart by a distance greater than a diameter of the flexible handling line.

7. The airship handling device of claim 6 wherein:
 the arm portion comprises a slot;
 the first line guide device is fixedly attached proximate to an end of the arm portion; and
 the second line guide device is at least partially received within the slot and movable relative to the slot between the first and second positions.

8. The airship handling device of claim 6 wherein the arm portion is pivotably movable relative to the base portion between a stowed position and an operating position in which the first and second line guide devices are positioned to contact the flexible handling line.

9. The airship handling device of claim 6, further comprising a handle assembly operably coupled to the arm portion and positioned to (a) releasably lock and unlock the arm portion in place relative to the base portion, and (b) move the second line guide device relative to the first line guide device.

10. The airship handling device of claim 6 wherein the first line guide device comprises a first hitch ball and the second line guide device comprises a second hitch ball.

11. The airship handling device of claim 1, further comprising the ground vehicle.

12. The airship handling device of claim 11 wherein the ground vehicle comprises a compact track or skid steer vehicle.

\* \* \* \* \*